(12) United States Patent
Fujisawa et al.

(10) Patent No.: US 7,416,683 B2
(45) Date of Patent: Aug. 26, 2008

(54) LIQUID CRYSTAL MIXED COMPOSITION AND RETARDATION FILM USING SAME

(75) Inventors: Hideyoshi Fujisawa, Saitama (JP); Kouichi Tanaka, Kita-ku (JP)

(73) Assignees: Nippon Kayku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 561 days.

(21) Appl. No.: 10/532,671

(22) PCT Filed: Nov. 6, 2003

(86) PCT No.: PCT/JP03/14157

§ 371 (c)(1), (2), (4) Date: Apr. 26, 2005

(87) PCT Pub. No.: WO2004/041925

PCT Pub. Date: May 21, 2004

(65) Prior Publication Data

US 2006/0060821 A1   Mar. 23, 2006

(30) Foreign Application Priority Data

Nov. 8, 2002   (JP) ............................. 2002-325656

(51) Int. Cl.
  *C09K 19/00*   (2006.01)
  *C09K 19/52*   (2006.01)

(52) U.S. Cl. ............. 252/299.1; 252/299.2; 252/299.3; 252/299.4; 252/299.5; 252/299.6; 252/299.7; 428/1.1; 428/1.2; 430/20; 430/270.1

(58) Field of Classification Search ... 252/299.1–299.7; 428/1.1, 1.2; 430/20, 270.1
See application file for complete search history.

(56) References Cited

U.S. PATENT DOCUMENTS 5,911,911 A   6/1999   Keller et al. ........... 252/299.01

7,163,723 B2 *   1/2007   Tanaka et al. ................ 428/1.1

FOREIGN PATENT DOCUMENTS

| EP | 0 799 877 | 10/1997 |
|---|---|---|
| JP | 61-060734 | 3/1986 |
| JP | 11-172118 | 6/1999 |
| JP | 2002-156527 | 5/2002 |
| JP | 2002-214410 | 7/2002 |
| WO | 01/88574 | 11/2001 |
| WO | 02/46808 | 6/2002 |
| WO | 02/073252 | 9/2002 |

OTHER PUBLICATIONS

J.Macromol.Sci.-Phys., B34(4), 357-367 (1995); S.H. Jiang et al.; Orientation of Polymer Chains in Oriented (E-CE)C/AA Liquid Crystalline Solutions.
Adv.Mater. 1997, 9, No. 2; Communications/Advanced Materials; Manfred Muller et al.; Solid Opalescent Films Originating from Urethanes of Cellulose.

* cited by examiner

*Primary Examiner*—Geraldina Visconti
(74) *Attorney, Agent, or Firm*—Nields & Lemack

(57) ABSTRACT

The invention relates to a liquid crystal mixed-composition comprising one or more cellulose derivatives and one or more liquid crystal compounds (preferably low-molecular liquid crystal compound) which can be oriented in a specific direction differing from that of the cellulose derivative, wherein the ratio by weight of the both is preferably in a range from 1:9 to 9:1, a retardation film produced using the composition, a circularly or elliptically polarizing film using the retardation film and an image display device provided with a circularly or elliptically polarizing film. The liquid crystal mixed-composition can be easily oriented in a specific direction on a rubbed substrate. If this orientation is fixed, a retardation film can be easily obtained which has such wavelength dispersion characteristics that the same level of retardation can be imparted to each wavelength in a wide visible region.

15 Claims, 3 Drawing Sheets

LIQUID CRYSTAL MIXED COMPOSITION AND RETARDATION FILM USING SAME

TECHNICAL FIELD

The present invention relates to a liquid crystal composition used to prepare a retardation film useful for image display devices such as liquid crystal display devices and to a retardation film obtained from the liquid crystal composition.

BACKGROUND ART

Current retardation films are obtained by uniaxially stretching plastic films such as polycarbonate, polyarylate and polyether sulfone and are films having the function of changing the polarization axis of linearly polarized light (optical rotation) and the function of converting linearly polarized light into circularly polarized light or elliptically polarized light. This retardation film generally has so-called wavelength dispersion characteristics that a retardation differs depending on wavelength and the wavelength dispersion characteristics differ depending on the type of material to be used. Usually used retardation films each have the characteristics that the retardation value in the wavelength side longer than 550 nm is smaller than the retardation value at a wavelength of 550 nm and the retardation value in the wavelength side shorter than 550 nm is larger than the retardation value at a wavelength of 550 nm. This tendency is more significant in the shorter wavelength side.

This poses, for example, the problem that when a retardation film (so-called quarter wavelength plate) having a retardation which is to be ¼ of the wavelength is used to produce an anti-reflection filter, a sufficient anti-reflection effect is obtained only in the wavelength range where the retardation is almost ¼ the wavelength and circularly polarized light is converted into elliptically polarized light at other wavelengths with the result that only insufficient anti-reflection effect is obtained. Also, when a retardation film (so-called half-wave plate) having a retardation which is to be ½ of the wavelength is used to produce a rotatory polarizer which is used for a liquid crystal projector and the like, only in the wavelength range where the retardation is almost ½ of the wavelength can rotate a linearly polarized light as linearly polarized light, and linearly polarized light is converted into elliptically polarized light at other wavelengths with the result that only an insufficient rotatory polarizing effect is obtained.

To deal with this problem, a method is proposed in which plural retardation films are laminated with their optical axis being crossed with each other in the publication of Japanese Patent Application Laid-Open (JP-A) No. 5-100114. This method, however, has the problem that it causes an increase in thickness due to the use of plural retardation films, such complexity of the production process in which plural retardation films are laminated with their optical axis being crossed with each other and a reduction in yield (these retardation films must be cut to cross these films with each other). In the meantime, a retardation film is proposed which can impart the same level of a retardation to each wavelength in a wide visible range by using only one film in the publication of JP-A No. 2000-137116.

However, because the wavelength dispersion characteristics are determined by the material to be used in a retardation film, there is a limitation to such a material as described in the publication of JP-A No. 2000-137116 which can improve the wavelength dispersion characteristics by using only one film. Also, because such a material does not function as a retardation film unless it is made into a film and the film is further stretched uniaxially, such a complex step involving filming and stretching must be carried out. Further, in the case where it is necessary to laminate the retardation films such that the polarization axis of a polarization film crosses at a specific angle with the slow axis of a retardation film, it is necessary to cut the film to laminate the cut film on another film even if the retardation film is one film, with the result that this causes a reduction in yield. In order to solve such a problem, there is a method disclosed in the publication of JP-A No. 2000-98133 in which using a composition obtained by adding a mixture of specific nonionic fluoroalkyl-alkoxylate surfactants to a mixture of specific low-molecular liquid crystal compounds which can be oriented on a substrate which has been subjected to rubbing treatment, the liquid crystal compound is oriented in a specific direction to obtain a retardation film. It is however difficult to obtain a very satisfactory film having such wavelength dispersion characteristics that the same level of retardation can be given to each wavelength in a wide visible range. According to the publication of WO02/093213 (PCT/JP02/04523), a retardation film having such wavelength dispersion characteristics is obtained by rubbing or stretching a film obtained from a liquid crystal cellulose derivative and a non-liquid crystal reactive product. However, there is the problem that when the film obtained from the liquid crystal composition as specifically disclosed in the publication is oriented in a specific direction on a rubbed substrate, satisfactory orientation is not obtained.

DISCLOSURE OF THE INVENTION

The inventors of the present invention have made earnest studies to solve the above problem and, as a result, found that the above problem is solved when a liquid crystal compound having a low-molecular weight is compounded in a liquid crystal cellulose derivative, to complete the present invention. Specifically, a layer of a liquid crystal mixed-composition according to the present invention is formed on a rubbed substrate, the liquid crystal compound is oriented in a specific direction and then the orientation is fixed, whereby a retardation film which is satisfied in the above wavelength dispersion characteristics can be easily obtained. Also, the inventors have found that in the case of using the liquid crystal mixed-composition of the present invention, the wavelength dispersion characteristics can be fairly controlled by controlling the conditions under which the retardation film is manufactured. Accordingly, the present invention relates to:

1. A liquid crystal mixed-composition comprising one or more cellulose derivatives and one or more liquid crystal compounds which can be oriented in a specific direction differing from that of said cellulose derivative.

2. The liquid crystal mixed-composition according to the above 1, wherein the ratio by weight of said one or more cellulose derivatives to said one or more liquid crystal compounds which can be oriented in a specific direction differing from that of said cellulose derivative is in a range from 1:9 to 9:1.

3. The liquid crystal mixed-composition according to the above 2, wherein the cellulose derivative has the following structure:

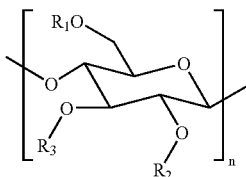

wherein $R_1$, $R_2$ and $R_3$, which may be the same or different, respectively represent a hydrogen atom or a substituent, provided that $R_1$, $R_2$ and $R_3$ are not all hydrogen atoms and n denotes an integer of 10 or more;

4. The liquid crystal mixed-composition according to the above 3, wherein at least one of $R_1$, $R_2$ and $R_3$ is a group selected from group consisting of an acyloxyalkyl group and a carbamoyloxyalkyl group and the remainders are hydrogen atoms.

5. The liquid crystal mixed-composition according to the above 1 to 4, wherein the liquid crystal compound which can be oriented in another specific direction is a low-molecular liquid crystal compound having a molecular weight of 1000 or less.

6. The liquid crystal mixed-composition according to the above 5, wherein the low-molecular liquid crystal compound is a (meth)acrylate liquid crystal compound.

7. The liquid crystal mixed-composition according to the above 6, wherein the (meth)acrylate liquid crystal compound is an acrylate compound represented by the following formula (2):

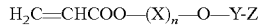

wherein X represents a methylene group which may be substituted with a methyl group or a phenyl group, Y represents a divalent group in which two to four rings selected from the group consisting of a benzene ring and a cyclohexane ring are connected by a single bond or a connecting group, where these rings may be respectively substituted with one or two C1-C6 alkyl groups or phenyl groups and Z represents a cyano group, an aliphatic group having 1 to 8 carbon atoms, an aliphatic oxy group having 1 to 8 carbon atoms or —O—$(X)_n$—OCOCH=$CH_2$.

8. A lyotropic liquid crystal mixed-composition comprising the mixed-composition as claimed in any one of the above 1 to 7 and an organic solvent, the composition exhibiting a lyotropic liquid crystal state.

9. The liquid crystal mixed-composition according to the above 8, the composition further comprising a reactive compound and a photoinitiator.

10. The liquid crystal mixed-composition according to the above 8, wherein the reactive compound is a (meth)acryl compound.

11. A retardation film produced from the liquid crystal mixed-composition as claimed in any one of the above 1 to 10, wherein the liquid crystal mixed-composition is oriented in a specific direction;

12. The retardation film according to the above 11, wherein the relation Re450≦Re550≦Re650 is established between the retardation value (Re450) measured at a wavelength of 450 nm, the retardation value (Re550) measured at a wavelength of 550 nm and the retardation value (Re650) measured at a wavelength of 650 nm;

13. The retardation film according to the above 11 or 12, the film being produced by forming a layer of the liquid crystal mixed-composition as claimed in any one of claims 1 to 10 on the rubbed substrate and by orienting the liquid crystal.

14. The retardation film according to the above 13, the orientation of the liquid crystal mixed-composition is fixed.

15. The retardation film according to the above 11, the film having a retardation of a quarter wavelength or a half wavelength.

16. A circularly or elliotically polarizing film or a rotatory polarizing film obtained by laminating the retardation film as claimed in any one of the above 11 to 15 and a polarizing film.

17. An image display device comprising the retardation film as claimed in any one of the above 11 to 15 or the circularly or elliptically polarizing film as claimed in claim 16.

18. A method of producing a retardation film according to claim 13, the method comprising forming a layer using the liquid crystal mixed-composition as claimed in any one of the above 1 to 10 on a rubbed substrate, followed by heat treatment.

19. The method of producing a retardation film according to the above 18, wherein the relation Re450≦Re550≦Re650 is established between the retardation value (Re450) measured at a wavelength of 450 nm, the retardation value (Re550) measured at a wavelength of 550 nm and the retardation value (Re650) measured at a wavelength of 650 nm by carrying out heat treatment at 40° C. to 100° C.

BEST MODE FOR CARRYING OUT THE INVENTION

Figure 1:
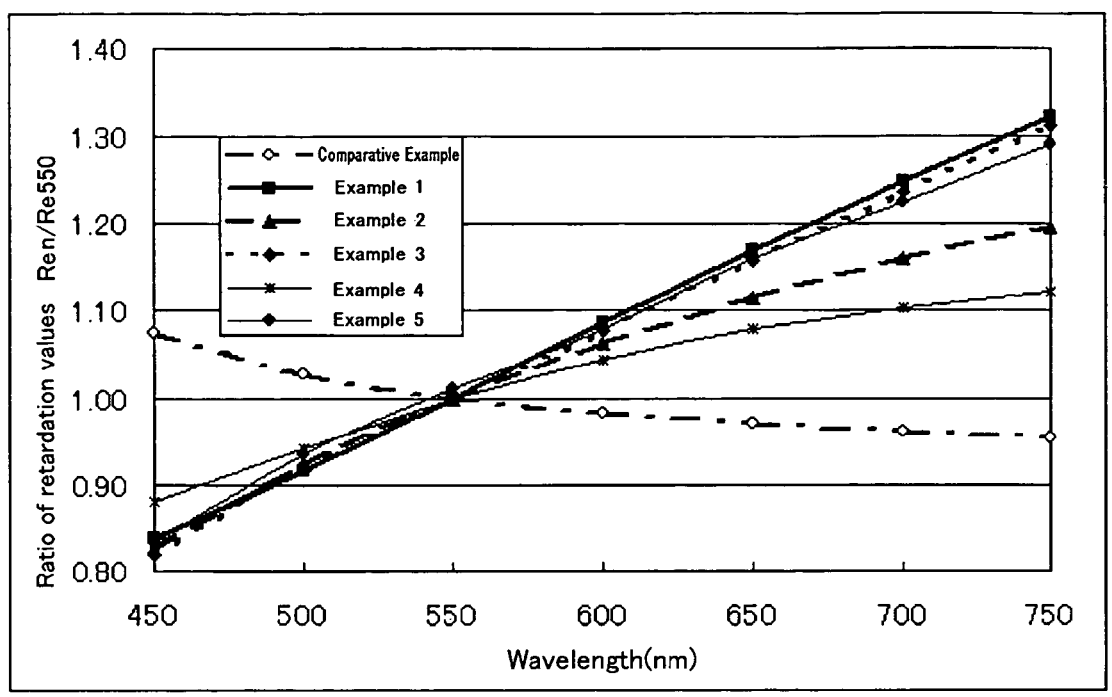
FIG. 1 is a graph showing the wavelength dispersion characteristics of each retardation film obtained in Examples 1 to 5 and Comparative Example.

The present invention will be explained in detail.

The retardation film of the present invention is obtained by orientation a liquid crystal mixed-composition in a specific direction, the composition containing a cellulose derivative and a liquid crystal compound which can be oriented in a specific direction differing from the oriented direction of the cellulose derivative. The term "cellulose derivative" in the present invention is used carrying an implication of a cellulose itself. Many cellulose derivatives show liquid crystalline property and the cellulose derivative used in the present invention is preferably those showing liquid crystalline properties. A cellulose derivative may be used in both of the case where it is a thermotropic liquid crystal and the case where it is a lyotropic liquid crystal.

Examples of the cellulose derivative which may be used in the present invention include cellulose derivatives represented by the following formula (1).

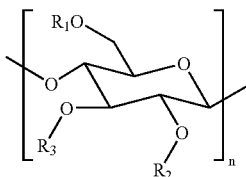
(1)

wherein $R_1$, $R_2$ and $R_3$, which may be the same or different, respectively represent a hydrogen atom or a substituent, provided that $R_1$, $R_2$ and $R_3$ are not all hydrogen atoms and n denotes an integer of 10 or more. When $R_1$, $R_2$ and $R_3$ in the formula (1) are substituents differing from each other, the substitution ratio of each substituent is optional. Also, n is an integer of 10 or more, preferably 50 or more and more preferably 100 or more. Although there is particularly no upper limit of n, the upper limit is usually 30000 or less in average (average polymerization degree).

Specific examples of $R_1$, $R_2$ and $R_3$ in the formula (1) include alkyl groups such as a methyl group, ethyl group and propyl group and preferably C1-C5 alkyl groups, acyl groups such as an acetyl groups and a propionyl group and preferably C1-C3 acyl groups, nitrate ester groups, hydroxyalkyl groups such as a hydroxypropyl group and hydroxyethyl group and preferably hydroxy (C1-C5) alkyl groups and further those obtained by acylating or carbamoylating the hydroxyalkyl group, or those obtained by etherfying these hydroxyalkyl groups using a C1-C3 alkyl group substituted with an epoxy group. Among these compounds, those obtained by hydroxyalkylating a cellulose, followed by carbamoylating or acylating the alkylated cellulose are preferable. Specifically, in which $R_1$, $R_2$ or $R_3$ is represented by the following formula.

Ya-CO—O—R— group, or

Za-NH—CO—O—R— group

In the formula, R represents a divalent connecting group (may include an unsaturated bond as the case may be) having 1 to 5 carbon atoms and Ya represents an (C1-C10) aliphatic group which may have an unsaturated bond or a (C6-C14) aromatic group where the aliphatic group or the aromatic group may have a substituent. Za represents a substituted or unsubstituted (C1-C10) aliphatic group which may have an unsaturated bond. Examples of the substituent of the aliphatic groups include halogen atoms, substituted or unsubstituted amino groups, (C1-C10) amide groups, urethane groups having 1 to 10 carbon atoms, hydroxy groups, (C1-C14) acyloxy groups, (C1-C10) alkoxy groups, epoxy groups and substituted or unsubstituted (C6-C14) aromatic groups, wherein these groups may be substituted with plural same or different substituents. Also, examples of the substituent on the aromatic groups include (C1-C6) alkyl groups, hydroxy groups, (C1-C6) alkoxy groups, substituted or unsubstituted amino groups or (C6-C14) aromatic groups. Also, examples of the substituent on the amino group include C1-C6 alkyl groups.

Here, specific examples of R include C1-C4 polymethylene groups such as a methylene group, ethylene group, trimethylene group and tetramethylene group and C2-C4 alkenylene groups such as a vinylene group and propylene.

Specific examples of Ya include a methyl group, ethyl group, propyl group, isopropyl group, n-butyl group, isobutyl group, tert-butyl group, pentyl group, neopentyl group, hexyl group, cyclohexyl group, octyl group, nonyl group, decyl group, benzyl group, 1-naphthylmethyl group, trifluoromethyl group, aminomethyl group, 2-amino-ethyl group, 3-amino-n-propyl group, 4-amino-n-butyl group, or substituents obtained by substituting these amino groups with an amide or urethane, hydroxy substituted (C1-C4) alkyl groups or groups obtained by further substituting the hydroxyl group with a (C1-C14) acyl group or (C1-C10) alkyl group, vinyl groups which may be substituted with a (C1-C3) alkyl group, cyanobiphenyloxy (C3-C10) alkyl groups, (C1-C10) aliphatic groups, which may have an unsaturated bond, such as an acetylene group and cinnamoyl group, and aromatic groups, which may have a substituent, such as a phenyl group, naphthyl group, anthracenyl group, fluorenyl group, biphenyl group and 4-trifluoromethylphenyl group.

Examples of Za include a vinyl group, methyl group, ethyl group, propyl group, isopropyl group, n-butyl group, isobutyl group, tert-butyl group, pentyl group, neopentyl group, hexyl group, cyclohexyl group, octyl group, nonyl group, decyl group, benzyl group, 1-naphthylmethyl group and trifluoromethyl group.

In the present invention, the aliphatic group may be any one of saturated, unsaturated, branched, straight-chain and cyclic types. Typical examples of the aliphatic group include C1-C6 alkyl groups or C3-C6 alkenyl groups.

In the case of the cellulose derivatives obtained by introducing the aforementioned acyl group or carbamoyl group into a hydroxyl group of the hydroxyalkyl celluloses, the substitution ratio (called the degree of substitution as the case may be) of the acyl group or the carbamoyl group to all hydroxyl groups is usually about 30% to 100%, preferably about 40% to 90% and more preferably about 50% to 90%.

The molecular weight of the cellulose derivative used in the present invention is usually 2500 or more, preferably 5000 or more, more preferably 15000 or more and still more preferably 30000 or more though it is not particularly limited. The upper limit of the molecular weight is usually about 1000000 or less, preferably about 500000 or less, more preferably about 300000 or less and still more preferably about 200000 or less.

Preferable examples of the cellulose derivative used in the present invention include cellulose derivatives as described in the publication of WO02/093213.

As to these cellulose derivatives, one or more substituents are properly selected according to, for example, the temperature range where the target liquid crystal mixed-composition of the present invention exhibits liquid crystalline properties and the birefringence characteristics, wavelength dispersion characteristics, viscosity, orientating ability, processability and reactivity of the composition. Also, the degree of substitution of a hydroxyl group of the cellulose is appropriately selected according to, for example, the temperature range where the target liquid crystal mixed-composition of the present invention exhibits liquid crystalline properties and the birefringence characteristics, wavelength dispersion characteristics, viscosity, orientating ability, processability and reactivity of the composition.

The liquid crystal mixed-composition of the present invention features the aforementioned unique characteristics due to the interaction between the cellulose derivative and the liquid crystal compound which can be oriented in a specific direction. As the liquid crystal compound, a liquid crystal compound having a molecular weight as low as about 1000 or less is preferable, though any liquid crystal compound may be used without any particular limitation insofar as it is easily oriented in a rubbing direction on a rubbed film. The liquid crystal compound may be any of a thermotropic liquid crystal or a lyotropic liquid crystal. Preferable examples of the liquid crystal compound include those having thermotropic liquid crystalline properties and exhibiting a nematic phase. Also, those which are highly compatible with the cellulose derivative are preferable. Hereinafter, the liquid crystal compound is referred to simply as a low-molecular liquid crystal compound.

Specific examples of the low-molecular liquid crystal compound may include (meth)acrylate liquid crystal compounds (acrylate compounds or/and methacrylate compounds exhibiting liquid crystalline properties). Examples of the (meth) acrylate liquid crystal compound may include acrylate compounds represented by the following formula (2).

$$H_2C=CHCOO-(X)_n-O-Y-Z, \qquad (2)$$

wherein X represents a methylene group which may be substituted with a methyl group or a phenyl group, Y represents a divalent group in which 2 to 4 rings selected from the group consisting of a benzene ring and a cyclohexane ring are bonded by a single bond or a connecting group, where these rings may be respectively substituted with 1 or 2 C1-C6 alkyl groups or phenyl groups which may have a substituent and Z represents a cyano group, an aliphatic group having 1 to 8 carbon atoms, an aliphatic oxy group having 1 to 8 carbon atoms or —O— $(X)_n$—OCOCH=$CH_2$. As the connecting group, groups represented by —COO— are preferable, though any group may be used without any particular limitation insofar as the above compound exhibits liquid crystalline properties. Typical examples of the group represented by Y include -ph-ph-, -ph-COO-ph-, -ph-COO-ph-ph-, -ph-COO-ph-COO-ph-, -cyh-cyh-, -ph-cyh-, -cyh-COO-cyh-, -cyh-COO-cyh-cyh and -cyh-COO-cyh-COO-cyh-. In these formulae, -ph- represents a phenylene group which may have a substituent and -cyh- represents a cyclohexylene group which may have a substituent. Examples of the substituent on the phenylene group include the same substituents as those on the aromatic group, for example, C1-C4 lower alkyl groups and phenyl. Examples of the substituent on the cyclohexylene group include the same substituents as those on the aforementioned aliphatic group.

Specific examples of the (meth)acrylate liquid crystal compound include acrylate type low-molecular liquid crystals such as 4-(4'-cyano-4-biphenylyloxy)-butylacrylate, liquid crystal compounds having an acryloyl group and mixtures of these compounds as described in the publication of JP-A No. 2000-98133 or the publication of WO97/44703 and LPP F 301 CP (trade name, manufactured by Vantico Company, acrylate type low-molecular liquid crystal).

Examples of other low-molecular liquid crystal compound include TL-202 (trade name, manufactured by Merck Company, mixture of low-molecular liquid crystals) and K-15 (trade name, manufactured by Merck Company, 4-cyano-4-pentylbiphenyl).

In the present invention, it is preferable to use an acrylate type low-molecular liquid crystal compound from the reason that the liquid crystal layer is easily fixed by irradiation with ultraviolet rays.

Although the range where the mixed composition of the present invention exhibits liquid crystalline properties differs depending on the type of cellulose derivative to be mixed and the type of liquid crystal compound differing from the cellulose derivative, the mixing ratio by weight of the cellulose derivative to the liquid crystal compound is 1:9 to 9:1, preferably 15:85 to 70:30 and more preferably 20:80 to 50:50.

A composition having the above proportions is used to form a layer on a substrate rubbed under a proper condition and the formed layer is subjected to orientation treatment such as heating according to the need, whereby the liquid crystal mixed-composition in the layer can be oriented in the rubbing direction. Also, the retardation film of the present invention which is peeled from the substrate after the orientation condition is fixed according to need, fulfills the following relationship and can provide the same level of retardation to each wavelength in a wide visible region.

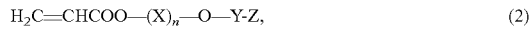

In the formula, Re450 is a retardation when the retardation film of the present invention is measured at a wavelength of 450 nm, Re 550 is a retardation when the same retardation film is measured at a wavelength of 550 nm and Re650 is a retardation when the same retardation film is measured at a wavelength of 650 nm. The most preferable composition ratio (weight ratio) used to obtain the retardation film of the present invention fulfilling the above relation formula is as follows: cellulose derivative said liquid crystal compound=20:80 to 50:50.

Additional components other than the cellulose derivative and the low-molecular liquid crystal compound in the liquid crystal mixed-composition of the present invention may be added to the extent that the liquid crystalline properties of the composition is not impaired. These additional components are added to adjust the liquid crystalline properties, orientation ability, processability and component compatibility of the liquid crystal mixed-composition and to fix the orientation after the liquid crystal mixed-composition is oriented in a specific direction.

In the present invention, a reactive compound may be contained as an additional component in the liquid crystal mixed-composition of the present invention for the purpose of fixing the oriented state. Although it is unnecessary to formulate the reactive compound when the orientation has been fixed or can be fixed even if the reactive compound is not used, it is usually preferable to formulate the reactive compound to fix the orientation. Any reactive compound may be used without any particular limitation insofar as it can fix the oriented state of the liquid crystal by, for example, crosslinking or polymerization. Usually, a non-crystalline liquid reactive compound is used. Examples of the non-crystalline liquid reactive compound may include (meth)acrylate compounds and compounds having a reactive group such as a glycidyl group or isocyanate group. The amount of the reactive compound to be mixed is usually about 0 to 200 parts, preferably about 0 to 100 parts and more preferably about 0 to 50 parts based on 100 parts of the liquid crystal composition though it is unnecessary to use the reactive compound when the liquid crystal compound is a (meth)acrylate compound.

In the case of fixing orientation, fixation by photopolymerization run by irradiation with ultraviolet rays which is relatively reduced in temperature change during polymerization is usually preferable. It is preferable to use a (meth)acrylate compound as the reactive compound when such photopolymerization is run.

Examples of the (meth)acrylate compound include ester of (meth)acrylic acid which are reaction products of polyhydric alcohols having 1 to 30 carbon atoms and 2 to 10 hydroxy groups and (meth)acrylic acids, (meth)acrylate compounds which are reaction products of glycidyl ethers of polyhydric alcohols having 1 to 30 carbon atoms and 2 to 10 hydroxy groups and (meth)acrylic acids, urethane(meth)acrylate compounds obtained by crosslinking hydroxy group residues of these (meth)acrylate compounds with diisocyanates and preferably urethane(meth)acrylate compounds obtained by crosslinking hydroxy group residues of these (meth)acrylate compounds with hydrocarbon diisocyanates having 3 to 15 carbon atoms and more preferably 5 to 10 carbon atoms and esters of methacrylate compounds having an isocyanuric ring, preferably esters of hydroxy(C1-C5) alkyl isocyanurates or its caprolactone modifications and (meth)acrylic acids.

Specific examples of the (meth)acrylate compound include reaction products of trimethylolpropanetri(meth)acrylate, pentaerythritoltri(meth)acrylate, pentaerythritoltetra(meth) acrylate, ditrimethylolpropanetetra(meth)acrylate, dipentaerythritolpentaacrylate, dipentaerythritolhexaacrylate or pentaerythritoltri(meth)acrylate and 1,6-hexamethylenediisocyanate, reaction products of pentaerythritoltri(meth) acrylate and isophoronedlisocyanate, reaction products of tris(acryloxyethyl)isocyanurate, tris(methacryloxyethyl)isocyanurate or glyceroltriglycidyl ether and (meth)acrylic acids, reaction products of caprolactone-modified tris(acryloxyethyl)isocyanurate or trimethylolpropanetriglycidyl ether and (meth)acrylic acids, reaction products of triglyceroldi(meth)acrylate or propylene glycol diglycidyl ether and (meth)acrylic acids, reaction products of polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate or 1,6-hexanediol diglycidyl ether and (meth)acrylic acids, reaction products of 1,6-hexanedioldi(meth)acrylate, glycerol di(meth)acrylate or ethylene glycol diglycidyl ether and (meth)acrylic acids, reaction products of diethylene glycol diglycidyl ether and (meth) acrylic acids, reaction products of bis(acryloxyethyl)hydroxyethylisocyanurate, bis (methacryloxyethyl)hydroxyethylisocyanurate or bisphenol A diglycidyl ether and (meth) acrylic acids, reaction products of tetrahydrofurfuryl(meth) acrylate, caprolactone-modified tetrahydrofurfuryl(meth) acrylate, 2-hydroxyethyl(meth)acrylate, 2-hydroxypropyl (meth)acrylate, polypropylene glycol (meth)acrylate, polyethylene glycol (meth)acrylate, phenoxyhydroxypropyl (meth)acrylate, acryloylmorpholine, methoxypolyethylene glycol (meth) acrylate, methoxytetraethylene glycol (meth) acrylate, methoxytriethylene glycol (meth)acrylate, methoxyethylene glycol (meth)acrylate, methoxyethyl(meth) acrylate, glycidyl(meth)acrylate, glycerol(meth)acrylate, ethylcarbitol(meth)acrylate, 2-ethoxyethyl(meth)acrylate, N,N-dimethylaminoethyl(meth)acrylate, 2-cyanoethyl (meth)acrylate or butyl glycidyl ether and (meth)acrylic acids, butoxytriethylene glycol (meth)acrylate and butanediolmono(meth)acrylate. These compounds may be used either singly or by mixing plural compounds. A desired orientation state can be fixed by using such a reactive compound and polymerizing under appropriate conditions.

The liquid crystal mixed-composition of the present invention may contain a proper organic solvent for the purpose of, for example, adjusting viscosity so as to carry out coating and the like. It is unnecessary to use any solvent when the above reactive compound serves also as a compound having the ability of a solvent. However, when the reactive compound has no ability of a solvent or the above reactive compound is not used, it is preferable to use a solvent. The solvent is preferably used to the extent that it does not impair the liquid crystalline properties of the mixed composition when it is blended. Examples of the solvent include aliphatic hydrocarbons, aliphaticketones, aliphatic amines and aliphatic alcohols such as hexane, heptane, acetone, methyl ethyl ketone, cyclohexanone, cyclopentanone, triethylamine, 2-butanone, methanol, ethanol and isopropanol, further, aromatic hydrocarbons, aromatic amines and aromatic alcohols such as benzene, toluene, xylene, anisole, benzyl alcohol and benzylamine, and acetates such as ethyl acetate, butyl acetate and methyl acetate. These compounds may be formulated either singly or in combinations of two or more. Preferable examples of the solvent include ketone type solvents. Aliphatic ketones having about 3 to 7 carbon atoms are preferable. The concentration of a solid in the composition after the solvent is added is usually about 3 to 90%, preferably about 5 to 70%, more preferably about 5 to 60% and still more preferably about 5 to 50%. In the present invention, a composition that is put in a liquid crystalline properties-keeping state (referred to as lyotropic liquid crystal state) even in the case where a reactive compound and an organic solvent are added is called a lyotropic liquid crystal mixed-composition.

The mixed composition obtained in this manner is applied to the surface of the rubbed substrate, solvents are removed by heating or the like according to the need to form a layer of the mixed composition and the liquid crystal is oriented in a rubbing direction and fixed as it is, whereby the retardation film of the present invention can be obtained.

In the present invention, there is no particular limitation in the ratios of other additional components such as the non-liquid crystal reactive compound and photoinitiator to the total amount of the cellulose derivative and the liquid crystal compound insofar as the liquid crystalline properties of the resulting mixed composition is not impaired. The ratio of other additional components is about 1 part to 100 parts and preferably about 2 parts to 50 parts to total 100 parts of the cellulose derivative and the liquid crystal compound in the situation where volatile solvents are removed from the liquid crystal mixed-composition.

When the orientation is fixed by, for example, polymerization in the present invention, it is preferable to formulate an initiator in the compound composition of the present invention. When the compound composition is polymerized by, particularly, radiation such as ultraviolet rays, a photoinitiator is usually used. As the photoinitiator, compounds used for usual ultraviolet-curable resins may be used. Specific examples of the photoinitiator include 2-methyl-1-[4-(methylthio)phenyl]-2-morpholinopropan-1-one (Irgacure 907 manufactured by Ciba Specialty Chemicals Inc.), 1-hydroxycyclohexyl phenyl ketone (Irgacure 184, manufactured by Ciba Specialty Chemicals Inc.), 4-(2-hydroxyethoxy)-phenyl (2-hydroxy-2-propyl) ketone (Irgacure 2959, manufactured by Ciba Specialty Chemicals Inc.), 1-(4-dodecylphenyl)-2-hydroxy-2-methylpropan-1-one (Darocure 953, manufactured by Merck Company), 1-(4-isopropylphenyl)-2-hydroxy-2-methylpropan-1-one (Darocure 1116, manufactured by Merck Company), 2-hydroxy-2-methyl-1-phenylpropan-1-one (Irgacure 1173, manufactured by Ciba Specialty Chemicals Inc.), acetophenone type compounds such as diethoxyacetophenone, benzoin type compounds such as benzoin, benzoin methyl ether, benzoin ethyl ether, benzoin isopropyl ether, benzoin isobutyl ether and 2,2-dimethoxy-2-phenylacetophenone (Irgacure 651, manufactured by Ciba Specialty Chemicals Inc.), benzophenone type compounds such as benzoylbenzoic acid, methyl benzoylbenzoate, 4-phenylbenzophenone, hydroxybenzophenone, 4-benzoyl-4'-methyldiphenyl sulfide and 3,3'-dimethyl-4-methoxybenzophenone (Kayacure MBP, manufactured by Nippon Kayaku Co., Ltd.), and thioxanthone type compounds such as thioxanthone, 2-chlorothioxanthone (Kayacure CTX, manufactured by Nippon Kayaku Co., Ltd.), 2-methylthioxanthone, 2,4-dimethylthioxanthone (Kayacure RTX), isopropylthioxanthone, 2,4-dichlorothioxanthone (Kayacure CTX, manufactured by Nippon Kayaku Co., Ltd.), 2,4-diethylthioxanthone (Kayacure DETX, manufactured by Nippon Kayaku Co., Ltd.) and 2,4-diisopropylthioxanthone (Kayacure DITX, manufactured by Nippon Kayaku Co., Ltd.). These photoinitiators may be used singly or may be used by mixing two or more in an each desired ratio. Preferable examples include (C1-C6) alkyl phenyl ketones (the alkyl group may be substituted with, for example, a hydroxy group, C1-C4 alkoxy group or morpholino group and the phenyl group may be substituted with, for example, a C1-C15 alkyl group, C1-C4 alkoxy group or C1-C4 alkylthio group) such as 1-hydroxycyclohexyl phenyl ketone (Irgacure 184, manufactured by Ciba Specialty Chemicals Inc.).

When benzophenone type compounds or thioxanthone type compounds are used, an adjuvant may be used to promote a photopolymerization reaction. Examples of such an adjuvant include amine type compounds such as triethanolamine, methyldiethanolamine, triisopropanolamine, n-butylamine, n-methyldiethanolamine, diethylaminoethylmethacrylate, Michler's ketone, 4,4'-diethylaminophenone, ethyl 4-dimethylaminobenzoate, (n-butoxy)ethyl 4-dimethylaminobenzoate and isoamyl 4-dimethylaminobenzoate. The content of the photoinitiator is preferably about 0.5 parts by weight or more and about 10 parts by weight or less and more preferably about 2 parts by weight or more and about 8 parts by weight or less based on 100 parts by weight of the (meth) acrylate compound (including a liquid crystal polymer in the case where an acryloyl group is present in the polymer). Also, the content of the adjuvant is preferably about 0.5 equivalents to about 2 equivalents to the photoinitiator.

The quantity of the radiation of ultraviolet rays is preferably about 100 to 1000 mJ/cm$^2$ though it differs depending on the type of the liquid crystal mixed-composition, the type and amount of the photoinitiator to be added and film thickness. A layer of the composition is cured in any of air atmosphere and inert gas (for example, nitrogen) atmosphere when it is irradiated with ultraviolet rays. However, if the film thickness is thinner, the layer is insufficiently cured due to an oxygenic hindrance. In such a case, it is preferable to irradiate the layer with ultraviolet rays in an inert gas atmosphere.

Next, detailed explanations will be furnished as to the production of the retardation film of the present invention.

For example, the liquid crystal mixed-composition of the present invention or a lyotropic liquid crystal mixed-composition prepared by diluting the liquid crystal mixed-composition with a proper solvent so as to apply it easily as required is laminated on the rubbed surface of a substrate which has been subjected to rubbing treatment, by, for example, application, solvents are removed by heating or the like according to the need, and also the resulting layer is subjected to orientation treatment such as heating according to the need to orient the composition in the same direction as the rubbing direction. Even if the oriented direction of the composition imperfectly accords to the rubbing direction, there is no particular trouble if the performance to be intended can be attained. As to the direction of orientation, the composition can be oriented in a desired direction by changing the rubbing direction. No particular limitation to the temperature used in the orientation treatment insofar as the liquid crystal can be oriented in the rubbing direction. The temperature is usually about 10° C. or more, preferably about 20° C. or more and more preferably about 30° C. or more. The upper limit of the temperature is usually about 150° C. or less, preferably about 120° C. or less and more preferably about 110° C. or less.

Then, the state of orientation is fixed by, for example, polymerization and preferably photopolymerization by irradiation with ultraviolet rays and the fixed layer is peeled from the substrate, whereby the retardation film of the present invention can be obtained. Because the retardation of the retardation film obtained at this time is determined by the product of the birefringence of the oriented composition multiplied by the thickness of the composition layer, these factors may be properly adjusted according to the intended retardation of the retardation film.

Examples of the substrate used in the case of carrying out rubbing treatment include a triacetylcellulose film and polyimide or polyvinyl alcohol thin films formed on the surface of a glass plate. Also, the rubbing treatment is carried out in the following method: so-called velvet rubbing cloth made of nylon, rayon or cotton is applied to a metal roll or plastic roll to manufacture a rubbing roll, which is then brought into contact with the surface of the substrate with rotating the roll while the rubbing roll or the substrate is moved in one direction. When the substrate is a lengthy plastic film, it is possible to carry out rubbing treatment continuously by rotating the rubbing roll put in a fixed state at a high speed while the substrate is carried with bringing the substrate into contact with the rubbing roll. The condition of the rubbing treatment differs depending on the type of substrate to be used, the percentage composition of the liquid crystal mixed-composition of the present invention, the diameter of the roll, the number of contact movements or the number of rotations and direction of rotation of the roll, the moving speed of the substrate or the roll and the pressure of the rubbing roll pressed to the substrate, and is therefore set according to the situation.

The retardation film manufactured using the liquid crystal mixed-composition of the present invention preferably has the wavelength dispersion characteristics as shown by the following formula: Re450≦Re550≦Re650, between the retardation value (Re 450) measured at a wavelength of 450 nm, the retardation value (Re 550) measured at a wavelength of 550 nm and the retardation value (Re 650) measured at a wavelength of 650 nm. These wavelength dispersion characteristics can be controlled by the temperature and time when the composition is oriented.

For example, the wavelength dispersion characteristics of the retardation film obtained at orientation treatment temperatures of 40° C. and 55° C. differ from each other as shown below.

With regard to the retardation film obtained by orientation the composition at 40° C. when the ratio of the cellulose derivative to the low-molecular compound in the liquid crystal mixed-composition is, for example, 30 parts:70 parts, the ratio (retardation ratio) (Re 450/Re 550) of the retardation value measured at a wavelength of 450 nm to the retardation value measured at a wavelength of 550 nm and the ratio (retardation ratio) (Re 650/Re 550) of the retardation value measured at a wavelength of 650 nm to the retardation value measured at a wavelength of 550 nm are 0.75 and 1.06 respectively. When the orientation temperature is changed to 55° C., these ratios are 0.76 (Re 450/Re 550) and 1.07 (Re 650/Re 550) respectively.

Also, when the orientation treatment time is changed, the wavelength dispersion characteristics of the resulting retardation film of the present invention are changed as follows.

With regard to the retardation film obtained by orientation the composition at 40° C. for 30 minutes when the ratio of the cellulose derivative to the low-molecular liquid crystal composition is, for example, 20 parts by weight:80 parts by weight, the ratio (retardation ratio) (Re 450/Re 550) of the retardation value measured at a wavelength of 450 nm to the retardation value measured at a wavelength of 550 nm and the ratio (retardation ratio) (Re 650/Re 550) of the retardation value measured at a wavelength of 650 nm to the retardation value measured at a wavelength of 550 nm are 0.84 and 1.01 respectively. When the orientation time is changed to 22 hours, these ratios are 0.69 (Re 450/Re 550) and 1.07 (Re 650/Re 550) respectively.

The retardation film obtained in this manner according to the present invention and the used polarizing film are laminated such that the slow axis of the retardation film of the present invention forms a predetermined angle with the absorption axis of the polarizing film, whereby the elliptically polarizing film can be obtained. Also, the retardation value of the retardation film of the present invention at a wavelength of 550 nm is made to be about 137 nm and the retardation film obtained in this manner according to the present invention and the polarizing film are laminated such that the slow axis of the retardation film forms an angle of 45° with the absorption axis of the polarizing film, whereby the circularly polarizing film of the present invention can be obtained. Moreover, the retardation value of the retardation film of the present invention at a wavelength of 550 nm is made to be about 275 nm and the polarizing film and the retardation film are laminated such that the absorption axis of the polarizing film forms an angle of 45° with the slow axis of the retardation film, whereby the rotatory polarizing film of the present invention can be obtained. The circularly polarizing film obtained in this manner according to the present invention is used in, for example, a reflection type or a reflection semi-transmittable type liquid crystal display device or the rotatory polarizing film of the present invention is used in a liquid crystal projector, and thus an image display device according to the present invention can be obtained. If, particularly, the wavelength dispersion characteristics of the circularly polarizing plate are such that the retardation is almost ¼ of each wavelength in the visible region, linearly polarized light can be converted into circularly polarized light in a wide wavelength range. Therefore, an image display device having a more excellent reflection preventive effect and contrast-improving effect than a circularly polarized plate using usual polycarbonate can be obtained.

The rotatory polarizing film of the present invention can rotate the polarization axis of linearly polarized light without converting the linearly polarized light into elliptically polarized light in a wide wavelength range if the wavelength dispersion characteristics of the retardation film are such that the retardation is almost ½ of each wavelength in the visible region. Therefore, if the rotatory polarizing film is used in a liquid crystal projector, light-utilization efficiency can be improved and a deterioration of a polarizing film caused by absorption of light can be prevented. Since the retardation film of the present invention enables the liquid crystal mixed-composition to be oriented in a rubbing direction by rubbing treatment and it is therefore possible to change the direction of the slow axis by changing the rubbing direction. This ensures that a retardation film in which the slow axis inclines at 45° with the longitudinal direction can be produced, for example, by using a roll-like lengthy high-molecular film, rubbing the film in a direction at 45° with the longitudinal direction, then forming a layer of the liquid crystal mixed-composition of the present invention and orientation the composition in the rubbing direction. This retardation film and a polarizing film (polarizing films obtained by usual uniaxial orientation have a roll-like form and its absorption axis extending in the longitudinal direction) are laminated by a roll-to-roll method to thereby obtain the aforementioned circularly polarizing film and rotatory polarizing film. This method makes it possible to make an improvement in yield more significantly than in the case of cutting one of a uniaxially stretched polarizing film and a retardation film to laminate.

EXAMPLES

The present invention will be explained in more detail by way of examples.

Example 1

900 ml of acetone was added in a reaction container charged with 30.0 g of hydroxypropyl cellulose HPC (manufactured by Aldrich Company, molecular weight: 100,000) and the mixture was refluxed under heating in an 80° C. bath. After it was confirmed that the mixture was completely dissolved, the temperature of the reaction solution was dropped to room temperature. Then, 76.1 ml of triethylamine and then, 62.2 ml of pivaloyl chloride were added to the reaction solution. After the mixture was stirred at room temperature for 5 minutes, it was stirred for 4 and a half hours in a 75° C. bath. An enameled container was charged with 18 L of water, followed by stirring, to which was then added the reaction solution and the resulting mixture was allowed to stand for while. The precipitates produced by this reprecipitation operation were washed with flowing water several times and then dissolved under heating in 1.8 L of acetone. After a reprecipitation operation was performed using 18 L of water and the crystals were washed with flowing water, 31.0 g of a pivaloyl compound of hydroxypropyl cellulose (($CH_3$)$_3$ CO—)HPC to be intended was obtained. The degree of substitution of a pivaloyl group based on the mol number of hydroxyl groups of the reaction raw material HPC was about 70%. This compound was observed to have a texture peculiar to a cellulose having liquid crystalline properties by the shearing of a cast film.

Next, 9 of methyl ethyl ketone was added to 1 of the pivaloyl compound of hydroxypropyl cellulose and swelled and dissolved to obtain a solution having a solid content of 10% by weight. To this solution were added a liquid crystal compound which was a mixture of ultraviolet-curable liquid crystal compounds (hereinafter referred to as a low-molecular liquid crystal mixture), specifically, 25 parts by weight of a compound represented by the following formula:

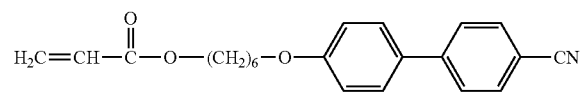

and 75 parts by weight of a compound represented by the following formula:

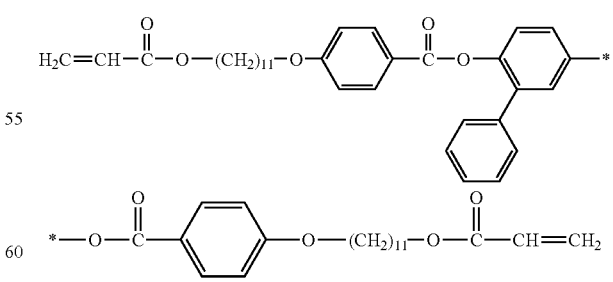

(in the formula, * shows that the groups on both sides thereof are bonded with each other.)

a reactive compound which was 1,6-hexanedioldiacrylate (Kayarad HDDA, manufactured by Nippon Kayaku Co., Ltd.) and a photoinitiator which was 1-hydroxycyclohexyl phenyl ketone (Irgacure 184, manufactured by Ciba Specialty Chemicals, Inc.) in the following ratio by weight:cellulose derivative:liquid crystal compound:reactive compound:photoinitiator:methyl ethyl ketone=20:80:2:4:180, to obtain a liquid crystal mixed-composition according to the present invention.

Then, an aqueous 1% solution of polyvinyl alcohol KM-11 (manufactured by The Nippon Synthetic Chemical Industry Co., Ltd.) was applied to a glass plate and dried by hot air. Then, the dried layer was rubbed 20 times by a roll around which a rubbing cloth YA-20R was wound. The solution of the liquid crystal mixed-composition which was prepared previously was applied to the rubbed surface by using a bar coater RDS-04, dried at 100° C. for one minute and kept on a 100° C. hot plate for 30 seconds. After that, the coated surface was irradiated with light from a high-pressure mercury lamp (80 W/cm) to fix the coated surface to obtain a retardation film according to the present invention. The retardation of the obtained retardation film was 86 nm. Then, the retardation value of this retardation film at each wavelength was measured using an automatic birefringence meter (KOBRA-21ADH, manufactured by Ohji Keisoku) to find the ratio (wavelength dispersion characteristics) of the retardation value at each wavelength to the retardation value at a wavelength of 550 nm. The results are shown in FIG. 1.

Example 2

100 ml of acetone was added in a reaction container charged with 5.0 g of hydroxypropyl cellulose HPC (manufactured by Aldrich Company, molecular weight: 100,000) and the mixture was refluxed under heating in an 80° C. bath. After it was confirmed that the mixture was completely dissolved, the temperature of the reaction solution was dropped to room temperature. Then, 12.5 ml of acryloyl chloride was added to the reaction solution, which was then stirred at room temperature for one hour and under reflux for 1.5 hours. Thereafter, 5.0 ml of propionyl chloride was added to the reaction mixture, which was then stirred for 30 minutes and also stirred under reflux for 1.5 hours. The reaction content was poured into 3 L of water to reprecipitate and the precipitated crystals were washed with water. Then, the crystals were dissolved under heating in 100 ml of acetone to repeat a reprecipitation operation three times by using 3 L of water. After water was thoroughly drained off, the precipitates were dried under vacuum in a light-shading condition to obtain 5.0 g of an acryloyl-propionyl compound of hydroxypropyl cellulose ($CH_2CHCO-$) ($C_2H_5CO-$)HPC. The degree of substitution of an acryloyl group based on the mol number of hydroxyl groups of the reaction raw material HPC was about 30% and the degree of substitution of a propionyl group based on the mol number of hydroxyl groups of the reaction raw material HPC was about 30%. This compound had selective reflection characteristics specific to a cholesteric liquid crystal and was observed to have a texture peculiar to a cholesteric liquid crystal cellulose when a cast film is sheared. Next, 9 of methyl ethyl ketone was added to 1 of the acryloyl-propionyl compound of hydroxypropyl cellulose and swelled and dissolved to obtain a solution having a solid content of 10% by weight. To this solution were added the low-molecular liquid crystal mixture used in Example 1 as a compound doubling as a liquid crystal compound and a reactive compound and 1-hydroxycyclohexyl phenyl ketone (Irgacure 184, manufactured by Ciba Specialty Chemicals) as a photoinitiator in the following ratio: cellulose derivative:liquid crystal compound:photoinitiator:methyl ethyl ketone=20:80:4:180, to obtain a liquid crystal mixed-composition according to the present invention.

Then, an aqueous 1% solution of polyvinyl alcohol KM-11 was applied to a glass plate and dried by hot air. Then, the dried layer was rubbed 50 times by a roll around which a rubbing cloth YA-20R was wound. The solution of the liquid crystal mixed-composition which was prepared previously was applied to the rubbed surface by using a bar coater RDS-06, dried at 100° C. for one minute and kept on a 100° C. hot plate for 30 seconds. After that, the coated surface was irradiated with light from a high-pressure mercury lamp (80 W/cm) to fix the coated surface to obtain a retardation film according to the present invention. The retardation value of the obtained retardation film was 67 nm. Then, the wavelength dispersion characteristics of this film were found in the same manner as in Example 1. The results are shown in FIG. 1.

Example 3

7.1 parts by weight of the pivaloyl compound of hydroxylpropyl cellulose used in Example 1, 28.6 parts by weight of the low-molecular liquid crystal mixture used in Example 1 and 64.3 parts by weight of methyl ethyl ketone were used to prepare a solution of a liquid crystal mixed-composition according to the present invention such that the concentration of a cellulose derivative after drying was 20% by weight.

Then, an aqueous 1% solution of polyvinyl alcohol KM-11 was applied to a glass plate and dried by hot air. Then, the dried layer was rubbed 50 times by a rubbing cloth YA-20R. The solution of the liquid compound composition which was prepared previously was applied to the rubbed surface by using a bar coater RDS-06, dried at 100° C. for one minute and kept on a 100° C. hot plate for 30 seconds and at room temperature for 72 hours, to obtain a retardation film according to the present invention. The retardation value of the obtained retardation film was 97 nm. Then, the wavelength dispersion characteristics of this film were found in the same manner as in Example 1. The results are shown in FIG. 1.

Example 4

8.1 parts by weight of the pivaloyl compound of hydroxylpropyl cellulose used in Example 1, 18.9 parts by weight of the low-molecular liquid crystal mixture used in Example 1 and 73 parts by weight of methyl ethyl ketone were used to prepare a solution of a liquid crystal mixed-composition according to the present invention such that the concentration of a cellulose derivative after drying was 30% by weight. The retardation value of the obtained retardation film which was measured in the same manner as in Example 1 was 116 nm. Then, the wavelength dispersion characteristics of this film were found in the same manner as in Example 1. The results are shown in FIG. 1.

Example 5

8.7 parts by weight of the pivaloyl compound of hydroxylpropyl cellulose used in Example 1, 13.0 parts by weight of the low-molecular liquid crystal mixture used in Example 1 and 78.3 parts by weight of methyl ethyl ketone were used to prepare a solution of a liquid crystal mixed-composition according to the present invention such that the concentration of a cellulose derivative after drying was 40% by weight. The retardation value of the retardation film which was measured in the same manner as in Example 1 was 82 nm. Then, the wavelength dispersion characteristics of this film were found in the same manner as in Example 1. The results are shown in FIG. 1.

Example 6

Figure 2:
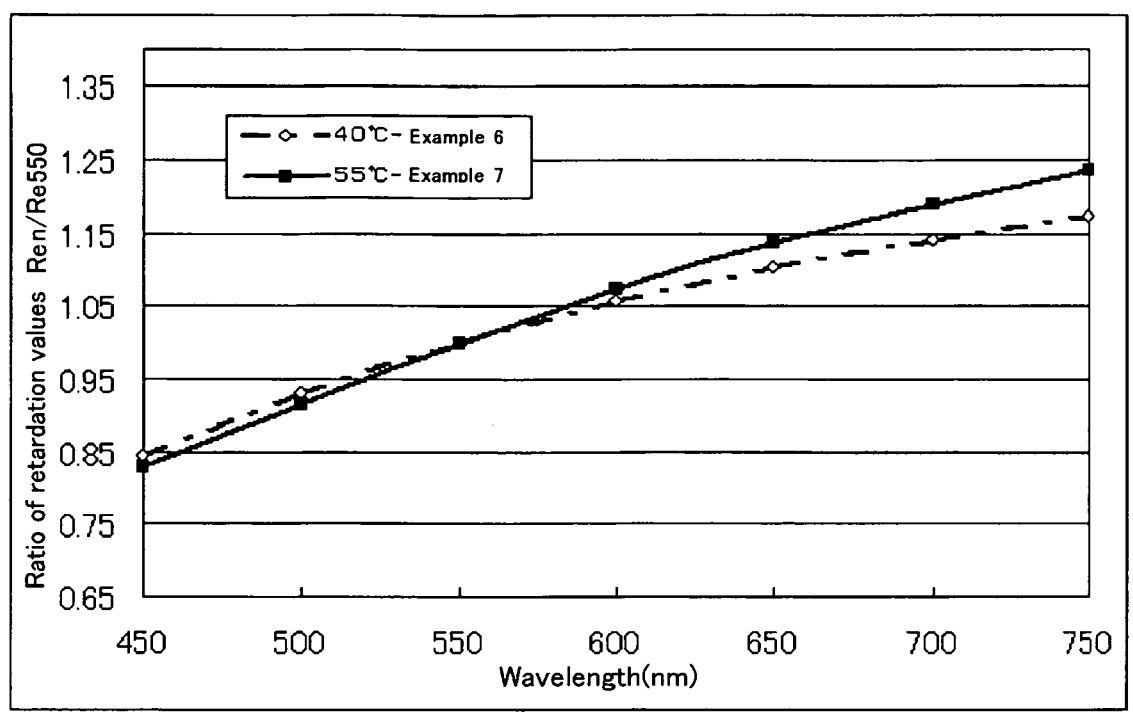
FIG. 2 is a graph showing the wavelength dispersion characteristics of each retardation film obtained in Examples 6 and 7.

The condition under which the retardation film of the present invention was kept after dried in the production of the film in Example 3 was changed to 40° C. and 22 hours. The retardation value of the obtained retardation film was 121 nm. Then, the wavelength dispersion characteristics of this film were found in the same manner as in Example 1. The results are shown in FIG. 2.

Example 7

The condition under which the retardation film of the present invention was kept after dried in the production of the film in Example 3 was changed to 55° C. and 28 hours. The retardation value of the obtained retardation film was 37 nm. Then, the wavelength dispersion characteristics of this film were found in the same manner as in Example 1. The results are shown in FIG. 2.

Example 8

Figure 3:
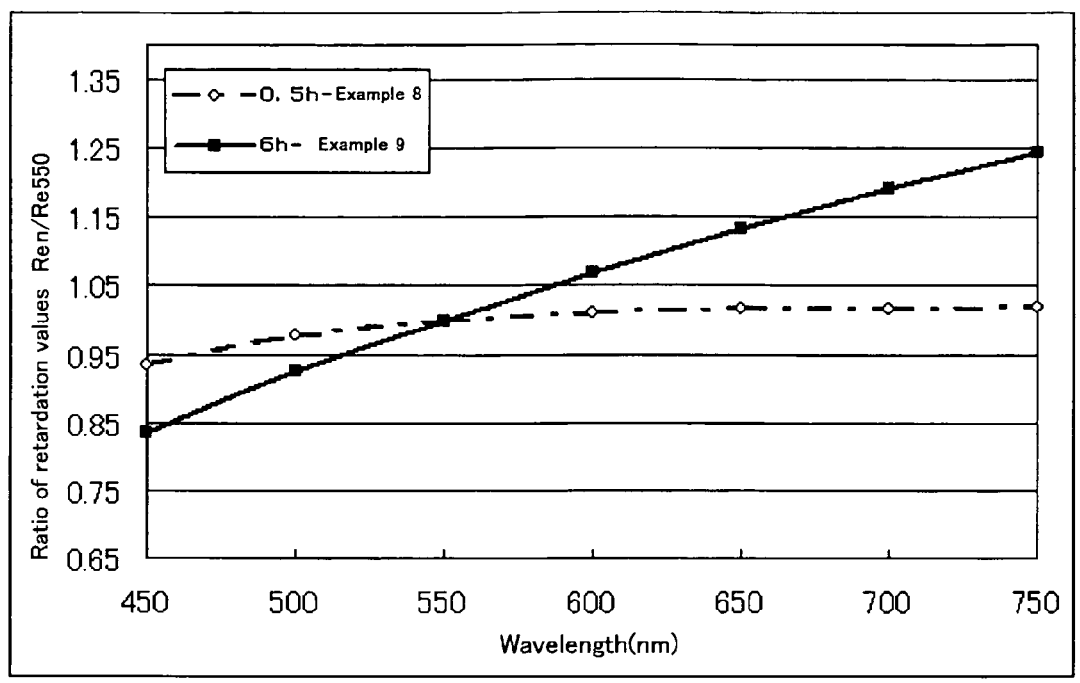
FIG. 3 is a graph showing the wavelength dispersion characteristics of each retardation film obtained in Examples 8 and 9.

The condition under which the retardation film of the present invention was kept after dried in the production of the film in Example 3 was changed to 40° C. and 30 minutes. The retardation value of the obtained retardation film was 137 nm. Then, the wavelength dispersion characteristics of this film were found in the same manner as in Example 1. The results are shown in FIG. 3.

Example 9

The condition under which the retardation film of the present invention was kept after dried in the production of the film in Example 3 was changed to 40° C. and 6 hours. The retardation value of the obtained retardation film was 101 nm. Then, the wavelength dispersion characteristics of this film were found in the same manner as in Example 1. The results are shown in FIG. 3.

Comparative Example

The wavelength dispersion characteristics of a polycarbonate retardation film (retardation: 140 nm) were evaluated in the same manner as in Example 1. The results are shown in FIG. 1.

From the results of comparison of the wavelength dispersion characteristics of each retardation film obtained in Example 1 to 5 and Comparative Example, it is found that the retardation film of the present invention has the characteristics that the retardation value in the wavelength side longer than 550 nm is larger than the retardation value at a wavelength of 550 nm and the retardation value in the wavelength side shorter than 550 nm is smaller than the retardation value at a wavelength of 550 nm and also found that the retardation film of the present invention provides almost equal retardation to each wavelength. Also, from the results of comparison between Examples 6 and 7, it is found that the wavelength dispersion characteristics can be changed by changing the temperature at which the retardation film is kept (orientation temperature) in the production of the retardation film of the present invention. Also, from the results of comparison between Examples 8 and 9, it is found that the wavelength dispersion characteristics can be changed by changing the time during which the retardation film is kept in the production of the retardation film of the present invention.

INDUSTRIAL APPLICABILITY

The liquid crystal mixed-composition of the present invention can be easily oriented in a specific direction on a rubbed substrate. If this orientation is fixed, a retardation film having such wavelength dispersion characteristics that almost the same retardation can be provided to each wavelength in a wide visible region can be easily obtained. If this retardation film is used, retardation films having various wavelength dispersion characteristics can be produced without laminating plural retardation films. The retardation film obtained in this manner may be used in combination with a polarizing film as a circularly or elliptically polarizing film or rotatory polarizing film in applications of various image display devices, whereby, for example, an excellent reflection preventive effect, contrast-improving effect and birefringence compensation effect can be obtained.

The invention claimed is:

1. A liquid crystal mixed-composition comprising the cellulose derivative which has the following structure:

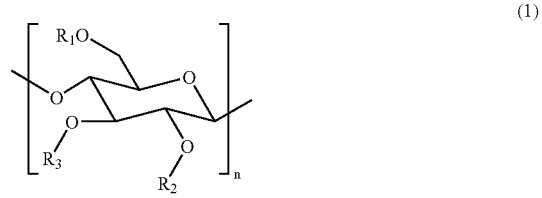

(1)

wherein $R_1$, $R_2$ and $R_3$, which may be the same or different, respectively represent a member selected from the group consisting of a hydrogen atom, an acyloxyalkyl group and a carbamoyloxyalkyl group, provided that $R_1$, $R_2$ and $R_3$ are not all hydrogen atoms and n denotes an integer of 10 or more; and one or more liquid crystal compounds which can be oriented in a specific direction differing from said cellulose derivative.

2. The liquid crystal mixed-composition according to claim 1, wherein the liquid crystal compound which can be oriented to the specific direction is a low-molecular liquid crystal compound having thermotropic liquid crystalline properties and exhibiting a nematic phase.

3. The liquid crystal mixed-composition according to claim 2, wherein the low-molecular liquid crystal compound is an acrylate liquid crystal compound.

4. The liquid crystal mixed-composition according to claim 1, wherein the composition further comprises a reactive compound and a photoinitiator.

5. The liquid crystal mixed-composition according to claim 4, wherein the reactive compound is a (meth)acryl compound.

6. A lyotropic liquid crystal mixed-composition wherein the lyotropic liquid crystal mixed-composition comprises the mixed-composition according to claim 1, and an organic solvent, and exhibits a lyotropic liquid crystal state.

7. A retardation film produced from the liquid crystal mixed-composition according to claim 1, wherein the liquid crystal mixed-composition is oriented in a specific direction.

8. The retardation film according to claim 7, wherein the relation Re450≦Re550≦Re650 is established between the retardation value (Re450) measured at a wavelength of 450 nm, the retardation value (Re550) measured at a wavelength of 550 nm and the retardation value (Re650) measured at a wavelength of 650 nm.

9. The retardation film according to claim 7, wherein the film is produced by forming a layer of the liquid crystal mixed-composition according to claim 1 on a rubbing treatment substrate for orientation of the liquid crystal.

10. The retardation film according to claim 9, wherein the orientation of the liquid crystal mixed-composition is fixed.

11. The retardation film according to claim 7, wherein the film has a retardation of a quarter wavelength or a half wavelength.

12. A circularly or elliptically polarizing film or a rotatory polarizing film obtained by laminating the retardation film according to claim 7 and a polarizing film.

13. An image display device having the retardation film as claimed in according to claim 7.

14. A method of producing the retardation film according to claim 9, characterized by forming a layer with the liquid crystal mixed-composition according to claim 1 on a rubbing treatment substrate, followed by heat treatment.

15. An image display device having the circularly or elliptically polarizing film or the rotatory polarizing film according to claim 12.

* * * * *